US005651082A

United States Patent [19]
Eoll

[11] Patent Number: 5,651,082
[45] Date of Patent: Jul. 22, 1997

[54] OPTICAL RIBBON CABLES AND STRANDING METHOD

[75] Inventor: Christopher K. Eoll, Hickory, N.C.

[73] Assignee: Siecor Corporation, Hickory, N.C.

[21] Appl. No.: 664,694

[22] Filed: Jun. 17, 1996

[51] Int. Cl.⁶ .................................................. G02B 6/44
[52] U.S. Cl. ........................... 385/114; 385/110; 385/105
[58] Field of Search .......................... 385/100–114; 264/1.29

[56] References Cited

U.S. PATENT DOCUMENTS

| | | | |
|---|---|---|---|
| 5,193,134 | 3/1993 | Pizzorno et al. | 385/105 |
| 5,380,472 | 1/1995 | Schneider | 264/1.29 |
| 5,420,955 | 5/1995 | Cooke et al. | 385/114 X |
| 5,487,126 | 1/1996 | Oestreich et al. | 385/114 X |
| 5,517,591 | 5/1996 | Wagman et al. | 385/114 X |

FOREIGN PATENT DOCUMENTS 61-53612   3/1986   Japan.

*Primary Examiner*—Phan T. H. Palmer
*Attorney, Agent, or Firm*—J. David Abernethy

[57] ABSTRACT

A method of stranding light waveguide ribbon cables, such as slotted core type cables, including stacks of light waveguide ribbons. A radially inward light waveguide ribbon in a stack is stranded at a lower tension than a radially outward light waveguide ribbon in the stack. The stack of light waveguide ribbons may be disposed in other slotted carriers such as U-shaped members or folded tapes.

19 Claims, 3 Drawing Sheets

OPTICAL RIBBON CABLES AND STRANDING METHOD

BACKGROUND OF THE INVENTION

This invention relates to a process for making a light waveguide telecommunication cable in which the light waveguides are incorporated into ribbons which are housed in one or more slots. If the slots are formed in the periphery of a rod, such cables are slotted core ribbon cables. However, the method may also be practiced in cables having slots formed by other carriers, such as those having a "U" shape in cross-section.

Light waveguide cables are now commonly used to transmit information over long distances. Such cables have been used for years by providers of telephone service, and increasingly are coming into use in cable television networks. The large bandwidth, light weight, and proven long term reliability of light waveguide cables make them ideal for a variety of uses in the telecommunication industry.

An early example of a slotted core ribbon cable is described in German Patent No. 25 07 583, granted in 1984 and assigned to Siemens AG. This cable comprises a rod having a central strength member formed of nickel alloyed steel wires. About the central member is provided an extruded plastic layer having a plurality of outwardly opening peripheral slots. A light waveguide ribbon is inserted into each slot. The light waveguide ribbons are thus housed in chambers formed by the slotted rod and an overlying covering. There may be a metal armoring layer around the covering. Finally, the assembly is covered by an outer sheath of extruded plastic material.

The light waveguide ribbons themselves comprise a plurality of individually coated light waveguides which may be embedded in side-by side relation within a relatively flat common coating of plastic material. The common coating is sometimes called a matrix coating. Alternatively, the light waveguides may be sandwiched between two flat strips, each of which may be formed of plastic material. Each of the individually coated light waveguides commonly includes a colored layer to enable them to be identified and distinguished from each other. The coated light waveguides may be arranged in contacting relation, or may instead be arranged such that each is separated from adjacent light waveguides in the ribbon by the common coating material. Light waveguide ribbons typically utilize ultraviolet light cured acrylate material for the common coating as well as the coatings for the individual light waveguides.

It is now common for slotted core ribbon cables to include a stack of light waveguide ribbons in each peripheral slot. Each slot is formed so as to have a floor and two side walls. During stranding, the stack of light waveguide ribbons comprises a plurality of light waveguide ribbons, with a bottom ribbon lying along the slot floor in the radially innermost position and each subsequent ribbon placed over the underlying ribbon. In this fashion, each ribbon is arranged to be separated from the slot floor by the underlying ribbons in the stack, and the outermost ribbon in the stack is at the radially outermost position with respect to the axis of the rod.

The slots housing the light waveguide ribbons commonly are formed so as to proceed in helical fashion to minimize stress placed on the ribbons when the cable is pulled or bent during installation, or when the cable expands or contracts in response to changes in temperature. In the alternative, the slots may have a lay which repeatedly changes direction (hand); sometimes this formation is called S-Z, with reference to the shapes of the letters S and Z.

If it is desirable to strand the ribbons into the rod slots such that the ribbons have excess length at room temperature, then stranding may take place with the rod being under a relatively high strain and the ribbons being under relatively low strains. When tension on the core is released, the rod shortens, so that the ribbons become longer than the helical lengths of the slots.

Japanese patent application 60-239059, published May 7, 1987 as publication 62-98313, describes a slotted core cable having ribbon supply tensions of 400 g, 330 g, 250 g, 170 g, and 80 g respectively moving from the innermost ribbon to the outermost ribbon of a stack in a helical slot. Thus, the supply tension decreases from the innermost ribbon of the stack to the outermost ribbon of the stack.

Similarly, U.S. Pat. No. 5,193,134 describes slotted core cables in which the longitudinal tensions applied to the stacked ribbons in a helical slot decreases starting from the slot floor. In a first example, the longitudinal tensions applied to ribbons which are radially superposed are 330 g, 300 g, 240 g and 210 g, and in the second example are 220 g, 200 g, 180 g, 160 g and 140 g proceeding outward from the slot floor.

When a ribbon is stranded helically, each fiber in the ribbon is in a helical configuration. If P is the pitch (lay length) of the helix of a representative fiber in the ribbon and r is the radius of the helix, then the length L of the helical path over a pitch is given by the well known formula:

$$L^2 = (2\pi r)^2 + P^2. \qquad \text{(Eq. 1)}$$

By taking differentials of both sides of Eq. 1, and noting that L and P are approximately equal when r is much smaller than P, then on replacing the differentials with incremental quantities one obtains:

$$\Delta L/L \approx (2\pi/P)^2 r \Delta R + \Delta P/P \qquad \text{(Eq. 2)}$$

As the core tension is released after stranding with the rod under a higher strain than the ribbons, the rod strain falls by the amount $\Delta P/P$. As a result, so long as tension remains in all of the ribbons, the strains in all the ribbons in a stack fall by the same amount, $\Delta L/L$, which equals $\Delta P/P$; there is no tendency for the ribbons to move radially ($\Delta r=0$). Considering the outermost ribbon, for example, with the lowest stranding strain in the stack when manufactured according to the prior art, when $\Delta P/P$ falls by an amount numerically equal to the stranding strain of the outermost ribbon, then the strain on the outermost ribbon vanishes. The point of this zero ribbon strain is dependent on factors such as temperature and the particular stranding tensions placed on the ribbons and the rod. If one now uses Eq. 2 to describe the incremental changes beyond the point at which the strain in the outermost ribbon vanishes, the left hand side of the equation becomes zero because the outermost ribbon is no longer changing in length. Thus, the equation may then be written:

$$\Delta r/r = -(\Delta P/P)(P/2\pi r)^2. \qquad \text{(Eq. 3)}$$

Because $\Delta P$ is negative as the rod shortens, the right-hand side of Eq. 3 is positive, so the ribbon moves incrementally away from the axis of the rod. Finally, because all of the underlying ribbons were stranded at higher tensions than the top ribbon, the top ribbon begins to move in the radially outward direction away from the stack before the tensions vanish in any of the underlying ribbons. This process continues, with the ribbons lifting one at a time.

The stack may reform when all the ribbons have lifted. In the meantime, however, whenever adjacent ribbons have become separated, inter-ribbon friction is no longer present. Any mechanical perturbation of the ribbons may cause the stack to lose its integrity, no longer having a rectangular cross-section but instead having ribbons sticking out on one or both sides of the stack after it reforms. Space permitting, a ribbon in the slot may even turn and become lodged transversely to the rest of the ribbons.

Similar behavior may occur during temperature cycling, for example, during cooling from high temperatures when the core shrinks.

Loss of stack integrity can lead to impermissibly high attenuations in the light waveguides, harming the transmission capability of the cable.

SUMMARY OF THE INVENTION

It is therefore an object of the present invention to provide slotted core light waveguide ribbon cables having improved stack integrity.

Another object is to provide such cables having improved attenuation performance.

Yet another object is to provide cables including carriers or compartments for holding stacks of light waveguide ribbons with improved stack integrity and attenuation performance.

These and other objects are provided, according to the present invention, by providing a slotted core type light waveguide ribbon cable in which the ribbon at the bottom of a slot is stranded at the lowest tension, the next bottommost ribbon is stranded at a higher tension, and so on until the radially outermost ribbon in the slot is stranded at the highest tension. The tensions referred to are longitudinal tensions. Attenuation results for cables made using the inventive method proved superior to the attenuation results obtained from conventionally stranded slotted core cables.

In contrast to cables provided by the prior art, it is believed that as the core strain falls, the strain on the bottom, or radially innermost, ribbon vanishes while strain remains present in the other ribbons of the stack. The radially innermost ribbon tends to rise, but such motion is resisted by the other ribbons in the stack. Thus, as core strain continues to fall, the stack moves radially outward as a unit, with the radially innermost ribbons under longitudinal compression while the radially outermost ribbons are under tension. Inter-ribbon friction is always present between each pair of adjacent ribbons, and stack integrity is preserved. Similar behavior of the stack is expected when the cable cools from high temperatures. Improved stack integrity helps to improve cable attenuation performance after core shrinkage following cooling from high temperatures, or during core relaxation after exposure to tension. Such relaxation may occur during the manufacturing process.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
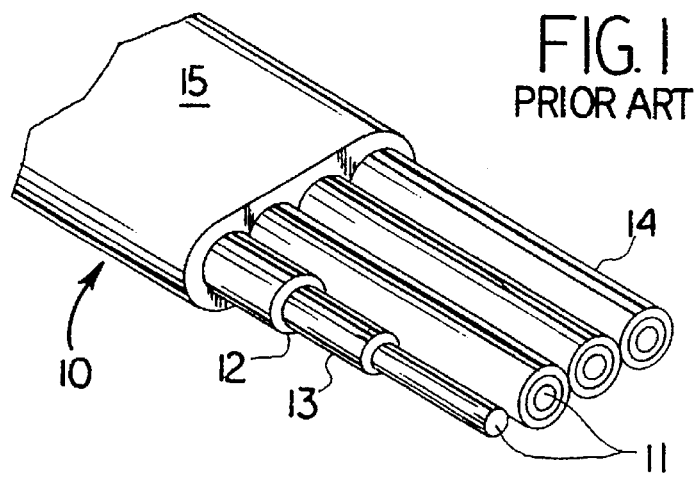
FIG. 1 is a perspective view of a conventional light waveguide ribbon.

FIG. 1 shows a conventional flat light waveguide ribbon 10. Ribbon 10 contains a plurality of light waveguides 11, each having an inner coating 13 and an outer coating 12. A thin colored layer 14 is placed on outer coating 12 to enable the optical fibers to be identified. An outer common layer is placed about the coated optical fibers. Ribbon 10 has two major surfaces 15 and a thickness therebetween.

Figure 2:
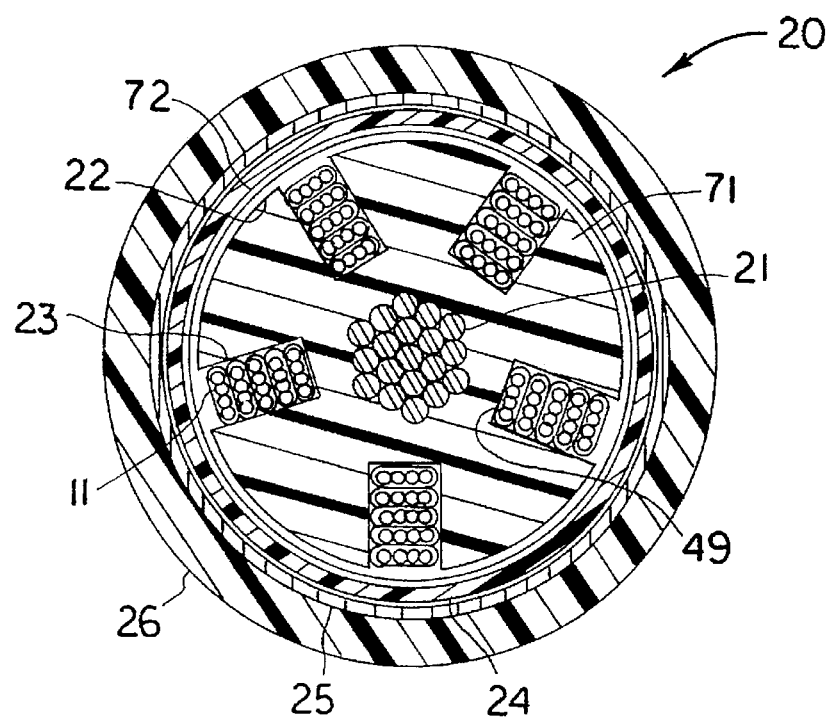
FIG. 2 is a cross-sectional view of a slotted core ribbon light waveguide telecommunication cable according to the present invention.

FIG. 2 shows a slotted core type cable 20 made according to the invention. Cable 20 has a central strength member 21 of stranded steel wires, which acts as the cable antibuckling member and usually also supplies a majority of the tensile strength of the cable needed during its installation. Of course, the central strength member alternatively could be formed of a dielectric material such as fiber-reinforced plastic.

Extruded about strength member central element 21 is a layer 71 formed of plastic material. Materials commonly used to form layer 71 are medium or high density polyethylene. Layer 71 includes a plurality of peripheral slots 23 in its exterior lateral surface, each of which has a floor and two sidewalls. Strength member 21 and plastic layer 71 together constitute the cylindrical reinforced slotted rod, which has a longitudinal axis at the longitudinal axis of strength member 21. Slots 23 may be formed by an extrusion die, as shown in U.S. Pat. No. 5,380,472 assigned to Siemens AG. In the alternative, the plastic material forming layer 71 may be extruded as a smooth rod and slots 23 may be subsequently formed by suitable grinding apparatus as is well known to the art.

Figure 3:
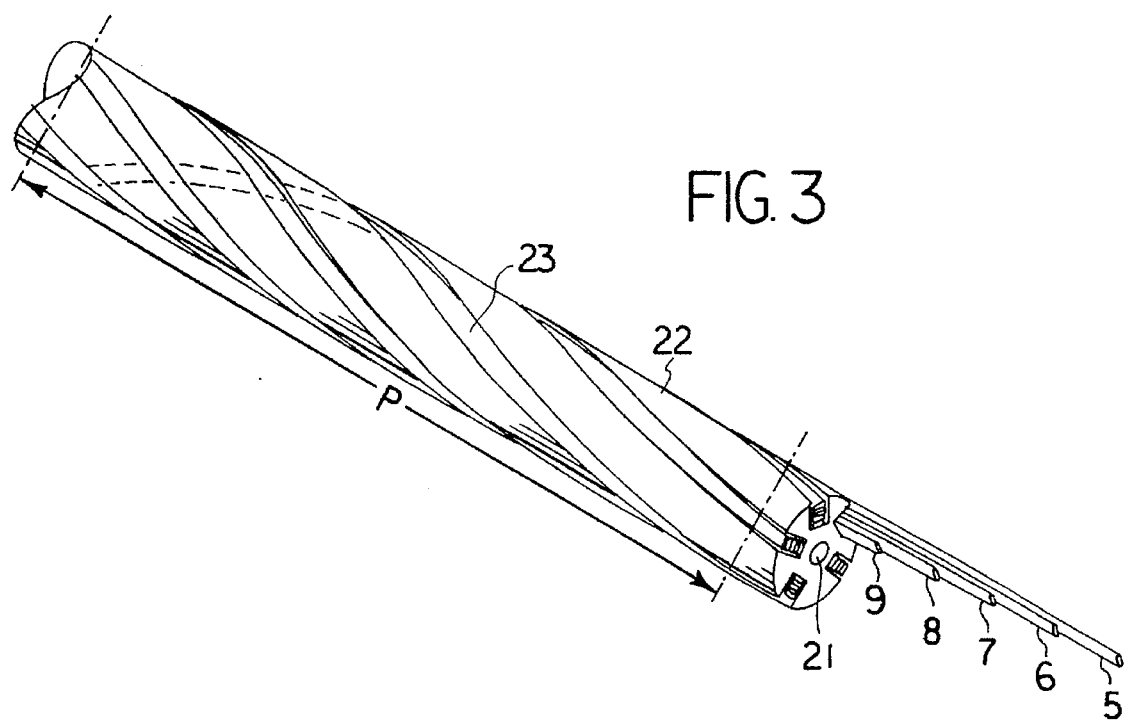
FIG. 3 is a perspective view of the core of the cable shown in FIG. 2.

As best shown in FIG. 3, each slot 23 contains a plurality of ribbons 10. The radially innermost ribbon 9 is overlaid in succession by ribbons 8, 7, 6, and 5, each as described with reference to FIG. 1. Returning to FIG. 2, the ribbons in each slot 23 form a radially superposed stack, ribbon 9 lying along the slot floor 49 and each successive ribbon disposed adjacent to and radially outward from the underlying ribbon. Each ribbon typically has a cross-section which is approximately rectangular with rounded corners. Thus, the radially innermost major surface 15 of ribbon 9 is adjacent to the slot floor, and major surfaces of ribbon 8 are adjacent to adjoining major surfaces of ribbons 9 and 7, and so on.

FIG. 3 illustrates the core of the cable of FIG. 2. Slots 23 proceed in a helical fashion, and have a pitch P. Light waveguide ribbons 5, 6, 7, 8, and 9 disposed in a slot 23 thus also have pitch P. Ribbon 9, having a major surface disposed along the floor of a slot 23, is located at a radial distance $r_9$ from the axis of the core, which is the axis of strength member 21. Considering ribbons 5–9 in a stack, with ribbon 5 as the radially outermost ribbon and ribbon 9 as the radially innermost ribbon, with $r_n$ designating the radius of ribbon n, $r_5 > r_6 > r_7 > r_8 > r_9$.

After the slotted rod has been manufactured, the ribbons are laid in or stranded in the slots 23 using one of the various stranding methods that are known to the art. An example of a stranding method is set out in German patent application DE 39 41 192 A1, published Jan. 3, 1991 and assigned to Siemens AG. This method begins by unwinding the central member from a rotating payoff and extruding the slotted plastic layer about the rotating central member. After cooling the central member in a water bath and drying the cooled central member, optical fiber ribbons are payed off from spaced-apart bobbins having fixed locations and pulled into the slots as stacks through the forward motion of the rotating slotted rod. The tensions applied to the optical fiber ribbons being laid into the slots are controlled. Typically, a tension is applied to the slotted rod which is greater than the tensions applied to the optical fiber ribbons.

Figure 4:
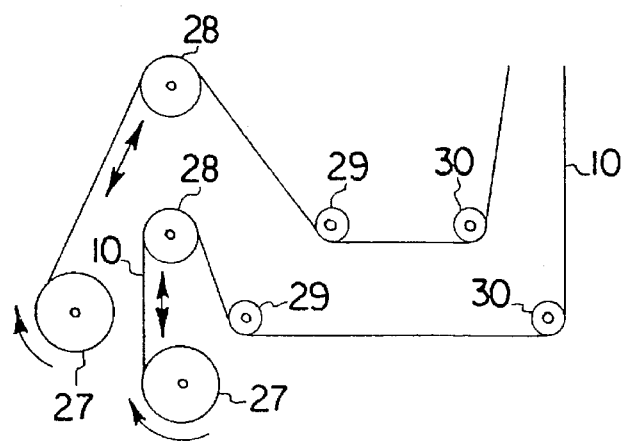
FIG. 4 is a schematic view of a method for applying a predetermined tension to optical fiber ribbons during stranding; and, FIG. 5 is a cross-sectional view of a second light waveguide telecommunication cable according to the invention.

With $T_n$ designating the tension applied during stranding to ribbon n according to the present invention, $T_5 > T_6 > T_7 > T_8 > T_9$, where the ribbons are numbered as above. Individual ribbon tensions may be controlled by any suitable apparatus. For example, in the apparatus shown in FIG. 4, a pair of ribbons 10 are unwound from respective rotating bobbins 27 and each proceeds around a dancer 28. Dancers 28 each may move in the directions shown by the arrows, as dictated by pneumatic devices subject to a control dial or switch on a stranding line control panel. Ribbons 10 then proceed around additional deflection sheaves 29 and 30 to the laying-in point. The ribbons in a stack preferably are kept spaced apart until the area of the laying-in point is reached, so that friction between adjacent ribbons does not interfere with the individual ribbon tensions. Although only two payoff sheaves are shown in FIG. 4, additional sheaves are provided according to the number of ribbons being stranded, and the sheave arrangement may be selected according to space available.

After the stranding of the ribbons, a moisture-absorptive tape 22 and binder 72 are wrapped around the slotted rod; an inner tube 24 may be extruded thereover; a metallic tape layer 25 may be applied; and an outer sheath 26 is extruded to complete the cable 20. Of course, the outer layers of the cable may include additional tensile strength members, ripcords, or other elements.

The inventive stranding method will now be compared to the conventional stranding method. Let the radially outermost ribbon in each stack now be designated as ribbon 1, the underlying adjacent ribbon be designated as ribbon 2, and so on. Let there be ten ribbons in each stack, whereby the radially innermost ribbon is designated as ribbon 10. In the conventional stranding method, the radially innermost ribbon is stranded at the highest tension and each overlying ribbon is stranded at a lower tension than the immediately underlying ribbon, with the radially outermost ribbon stranded at the lowest tension. In contrast, in the inventive stranding method, the radially innermost ribbon is stranded at the lowest tension and each overlying ribbon is stranded at a higher tension than the immediately underlying ribbon, with the radially outermost ribbon stranded at the highest tension.

A series of tests were performed comparing the attenuation performance of cables stranded by the conventional and inventive methods. The slots in each cable were formed so as to proceed in a helical path. In these tests, each stack tested contained ten light waveguide ribbons. Continuing to designate the radially outermost ribbon in each slot as ribbon 1, stranding tensions were applied as shown in Table 1 below. A tension much greater than 180 g was applied to the slotted rod during stranding.

TABLE 1

Conventional and Inventive Stranding Tensions

| Ribbon | Stranding tension, g Conventional method | Stranding tension, g Inventive method |
|---|---|---|
| 1 | 90 | 180 |
| 2 | 100 | 170 |
| 3 | 110 | 160 |
| 4 | 120 | 150 |
| 5 | 130 | 140 |
| 6 | 140 | 130 |
| 7 | 150 | 120 |
| 8 | 160 | 110 |
| 9 | 170 | 100 |
| 10 | 180 | 90 |

In each table below, the results are shown for the edge light waveguides in the radially innermost ribbon, ribbon 10, in the filled slots. These light waveguides typically are the most vulnerable to an attenuation increase at room temperature. Therefore, attenuations for the other light waveguides in the cables are not set out herein. Each attenuation reading was performed at 1550 nm on a jacketed cable on the reel at room temperature (23° C.).

The first test was performed on cables containing 8 slots. Two cables were made using conventional stranding, one cable containing five filled slots each containing ten ribbons and the other containing seven filled slots each containing ten ribbons. Thus, the attenuations of 24 light waveguides in cables made using conventional stranding are set out below. Similarly, two cables were stranded according to the inventive method, one cable having five filled slots each containing ten ribbons and the other having seven filled slots each containing ten ribbons, for a total of 24 attenuation measurements for cables stranded according to the inventive method. Test results for the 48 measurements are summarized in Table 2 below.

TABLE 2

Comparison of Attenuation Performance by Stranding Method

| Stranding method | Mean attenuation, dB/km | standard deviation |
|---|---|---|
| Conventional | 0.25 | 0.045 |
| Inventive | 0.22 | 0.011 |

The differences in attenuation were shown to be statistically significant in both an F test and a t-test.

The second test was performed on cables containing 13 slots. One cable containing ten filled slots each containing ten ribbons was made using conventional stranding. Thus, the attenuations of 20 light waveguides in a cable made using conventional stranding are set out below. Similarly, another cable containing ten filled slots each containing ten ribbons was stranded according to the inventive method, for a total of 20 attenuation measurements for a cable stranded according to the inventive method. Test results for the 40 measurements are summarized in Table 3 below.

TABLE 3

Comparison of Attenuation Performance by Stranding Method

| Stranding method | Mean attenuation, dB/km | standard deviation |
|---|---|---|
| Conventional | 0.26 | 0.079 |
| Inventive | 0.22 | 0.017 |

The differences in attenuation were shown to be statistically significant in both an F test and a t-test.

The third test was performed on cables containing 13 slots. One cable containing twelve filled slots each containing ten ribbons was made using conventional stranding. Thus, the attenuations of 24 light waveguides in a cable made using conventional stranding are set out below. Similarly, another cable containing twelve filled slots each containing ten ribbons was stranded according to the inventive method, for a total of 24 attenuation measurements for a cable stranded according to the inventive method. Test results for the 48 measurements are summarized in Table 4 below.

TABLE 4

Comparison of Attenuation Performance by Stranding Method

| Stranding method | Mean attenuation, dB/km | standard deviation |
|---|---|---|
| Conventional | 0.26 | 0.079 |
| Inventive | 0.22 | 0.017 |

The differences in attenuation were shown to be significant in both an F test and a t-test.

Lower attenuation is preferred, as attenuation is a loss of transmission capability. Therefore, cables stranded by the inventive method were shown to have significantly better attenuation performance than cables stranded by the conventional method. Light waveguides in cables manufactured according to the invention each had an attenuation of less than 0.3 dB/km as measured at 1550 nm at room temperature. In contrast, conventionally manufactured cables included some light waveguides having an attenuation of at least 0.4 dB/km for each of the cases for which attenuations are provided in the tables shown hereinabove. Test performance was consistent with predicted behavior of the cables after relaxation of the tensile loads placed thereon during manufacturing.

Although the inventive stranding method has been described with respect to cables having helical slots having a single direction of lay, the inventive method may nonetheless be used in cables having helical slots in which the direction of lay periodically reverses in S-Z fashion.

The inventive stranding method may be used in cables having more than one slotted rod, as all references are made with respect to the central axis of the rod containing the ribbons being considered. Each rod may have one or a plurality of slots, and every slot need not necessarily contain a stack of light waveguide ribbons. For example, one slot may contain a stack of light waveguide ribbons and another may contain moisture-absorptive material or one or more electrical telecommunication elements such as wires or paired wires. In certain cables where strength elements are provided elsewhere in the cable, the slotted rod may not have a central strength member. A coaxial electrical conductor may then lie along the axis of the rod. In other cables, the slotted rod may be formed from a plurality of subunits each containing one slot.

Figure 5:
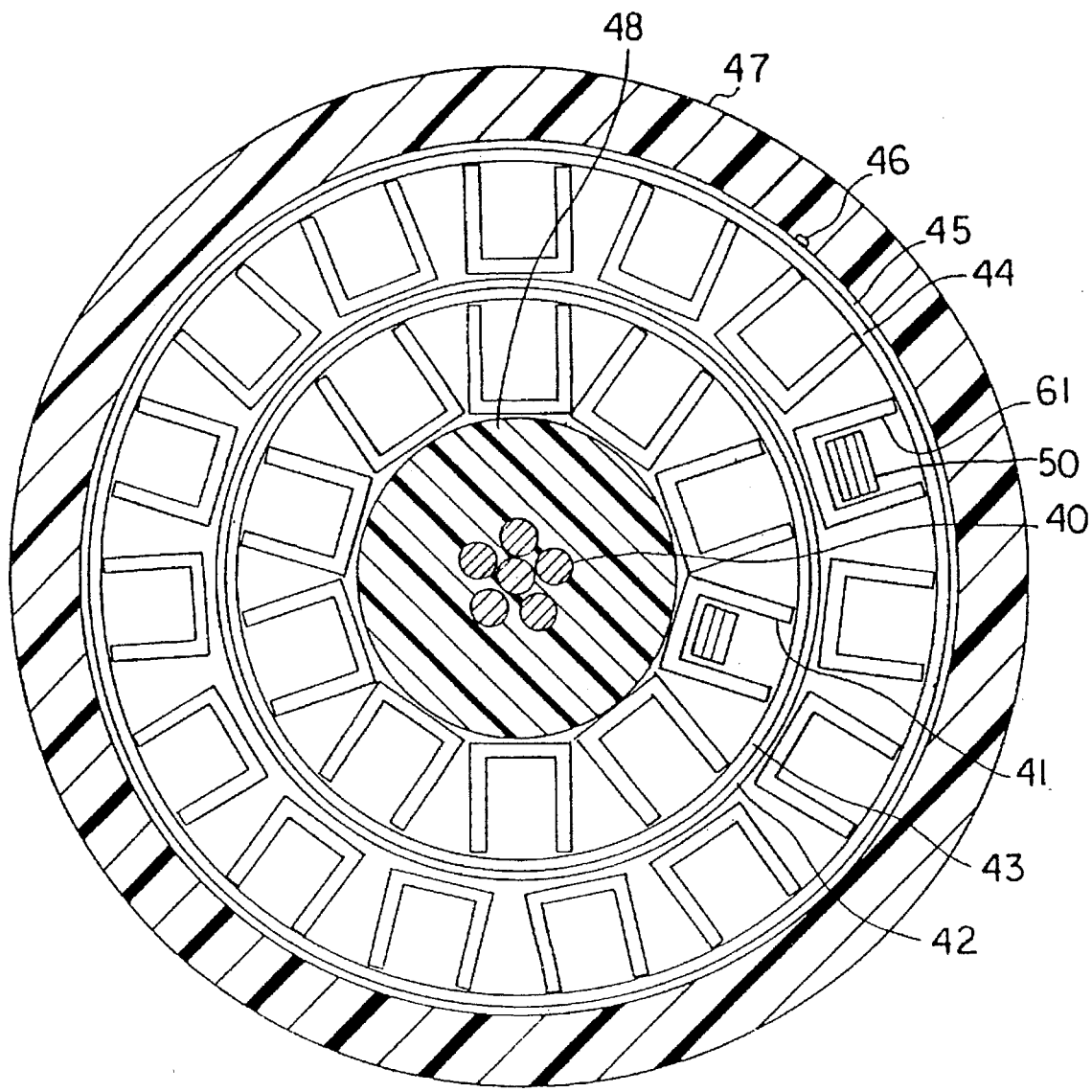

Likewise, the inventive stranding method is not restricted to slotted rod type cables, but may be applied to any cable in which a stack of light waveguide ribbons is inserted into a carrier or compartment. For example, the slot may be formed by a U-shaped carrier. The U-shaped carriers may be in the form of a folded tape or an extruded polymer material. The cable shown in FIG. 5 includes a central strength member 40 of stranded steel which is embedded in polymer material 48 to form a composite central element; a first layer of stranded U-shaped carriers 41 each of which may hold a stack of light waveguide ribbons stranded according to the invention as above described; a first moisture-absorptive tape 43 closing each of the U-shaped carriers of the first layer to form compartments; a first binder 42; a second layer of stranded U-shaped carriers 61, each of which may hold a stack 50 of light waveguide ribbons stranded according to the invention as above described; a second moisture-absorptive tape 44 closing each of the U-shaped carriers of the second layer to form compartments; a second binder 45, a rip cord 46; and an outer sheath 47. Each of the U-shaped carriers may include a slot which is open radially outward with respect to the axis of the composite central element. The extruded plastic of a slotted rod may itself be considered to be a slotted carrier around a central strength element.

The inventive method is proven to be effective when the difference in the tensions applied to adjacent ribbons is 10 g, and also should be effective at greater tension differentials. Effectiveness at tension differentials of less than 10 g may depend on the ability to control small variations in tension.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A method for making a light waveguide ribbon cable, comprising:

forming a central element having a longitudinal axis;

disposing a carrier about said central element, said carrier including a helical slot which is open radially outward with respect to said central element axis;

providing at least first and second relatively flat optical waveguide ribbons, each of said optical waveguide ribbons having two major surfaces and a thickness between said major surfaces; and, applying a first tension to said first ribbon and applying a second tension to said second ribbon while inserting said ribbons in said slot to form a radially superimposed stack, said first ribbon in said stack being located at a radially inward position and said second ribbon in said stack being located at a radially outward position with respect to said longitudinal axis of said central element, and said second tension exceeding said first tension.

2. A method as set out in claim 1, wherein said ribbons are unwound from spaced-apart payoff sheaves, and said ribbons are separated from each other for at least a predetermined distance prior to being inserted into said slot.

3. A method as set out in claim 1, wherein the difference in the tensions applied to said ribbons is at least 10 g.

4. A method as set out in claim 1, wherein during ribbon stranding the strain in the central element is greater than the strain in either of said ribbons.

5. A method as set out in claim 1, wherein the central element comprises an axial strength member.

6. A method as set out in claim 1, further comprising applying a moisture-absorptive tape about said carrier.

7. A method as set out in claim 1, wherein said slot has a single direction of lay.

8. A method as set out in claim 1, wherein said slot has a periodically reversing direction of lay.

9. A light waveguide cable, comprising:

a cylindrical rod having a longitudinal axis and provided with at least one peripheral helical slot in its exterior lateral surface; and, a radially superimposed stack comprising at least first and second relatively flat optical waveguide ribbons within said slot, each of said optical waveguide ribbons having two major surfaces and a thickness between said major surfaces, said first ribbon in said stack being located at a radially inward position and said second ribbon in said stack being located at a radially outward position with respect to said longitudinal axis of said rod, said first ribbon being under a first tension and said second ribbon being under a second tension, said second tension exceeding said first tension when said cable is under a predetermined tensile load.

10. A light waveguide cable as set out in claim 9, wherein each of said light waveguides has an attenuation of less than 0.3 dB/km measured at 1550 nm at 23° C.

11. A light waveguide cable as set out in claim 9, wherein each of said slots proceeds along the periphery of the rod with a single direction of lay.

12. A light waveguide cable as set out in claim 9, wherein each of said slots proceeds along the periphery of the rod with a periodically reversing direction of lay.

13. A light waveguide cable, comprising:

a cylindrical rod having a longitudinal axis and provided with at least one peripheral helical slot in its exterior lateral surface; and, a radially superimposed stack comprising at least first and second relatively flat optical waveguide ribbons within said slot, each of said optical waveguide ribbons having two major surfaces and a thickness between said major surfaces, said first ribbon in said stack being located at a radially inward position and said second ribbon in said stack being located at a radially outward position with respect to said longitudinal axis of said rod, said first ribbon being under a first tension and said second ribbon being under a second tension, said second tension exceeding said first tension when said cable is at at least a predetermined temperature.

14. A light waveguide cable as set out in claim 13, wherein each of said light waveguides has an attenuation of less than 0.3 dB/km measured at 1550 nm at 23° C.

15. A light waveguide cable as set out in claim 13, wherein each of said slots proceeds along the periphery of the rod with a single direction of lay.

16. A light waveguide cable as set out in claim 13, wherein each of said slots proceeds along the periphery of the rod with a periodically reversing direction of lay.

17. A method for making a slotted core cable for light waveguide ribbons, comprising:

forming a cylindrical rod having a longitudinal axis and provided with at least one peripheral helical slot in its exterior surface;

providing at least first and second relatively flat optical waveguide ribbons, each of said optical waveguide ribbons having two major surfaces and a thickness between said major surfaces; and, applying a first tension to said first ribbon and applying a second tension to said second ribbon while inserting said ribbons in said slot to form a radially superimposed stack, said first ribbon in said stack being located at a radially inward position and a second ribbon in said stack being located at a radially outward position with respect to said longitudinal axis of said rod, and said second tension exceeding said first tension.

18. A light waveguide ribbon cable, comprising:

a central element having a longitudinal axis;

a carrier disposed about said central element, said carrier including a helical slot which is open radially outward with respect to said central element axis; and, a radially superimposed stack comprising at least first and second relatively flat optical waveguide ribbons within said slot, each of said optical waveguide ribbons having two major surfaces and a thickness between said major surfaces, said first ribbon in said stack being located at a radially inward position and said second ribbon in said stack being located at a radially outward position with respect to said longitudinal axis of said central element, said first ribbon being under a first tension and said second ribbon being under a second tension, said second tension exceeding said first tension when said cable is under a predetermined tensile load.

19. A light waveguide ribbon cable, comprising:

a central element having a longitudinal axis;

a carrier disposed about said central element, said carrier including a helical slot which is open radially outward with respect to said central element axis; and, a radially superimposed stack comprising at least first and second relatively flat optical waveguide ribbons within said slot, each of said optical waveguide ribbons having two major surfaces and a thickness between said major surfaces, said first ribbon in said stack being located at a radially inward position and said second ribbon in said stack being located at a radially outward position with respect to said longitudinal axis of said central element, said first ribbon being under a first tension and said second ribbon being under a second tension, said second tension exceeding said first tension when said cable is at at least a predetermined temperature.

* * * * *